No. 890,609. PATENTED JUNE 16, 1908.
J. D. COLEMAN.
VALVE.
APPLICATION FILED MAR. 18, 1907.

Witnesses
W. O. Root
L. D. Leadbetter

Inventor
J. D. Coleman
By O. K. Grego
Atty.

UNITED STATES PATENT OFFICE.

JOHN D. COLEMAN, OF GLENWOOD, ILLINOIS.

VALVE.

No. 890,609.      Specification of Letters Patent.      Patented June 16, 1908.

Application filed March 18, 1907. Serial No. 362,909.

*To all whom it may concern:*

Be it known that I, JOHN D. COLEMAN, a citizen of the United States, residing at Glenwood, in the county of Cook and State of Illinois, have invented certain new and useful Improvements in Valves, of which the following is a specification.

My invention relates to improvements in valves, but more particularly to improvements in gates and seats for straight-way valves; and the object of my improvements is to provide a straight-way valve having a higher efficiency than those in general use.

Figure 1:
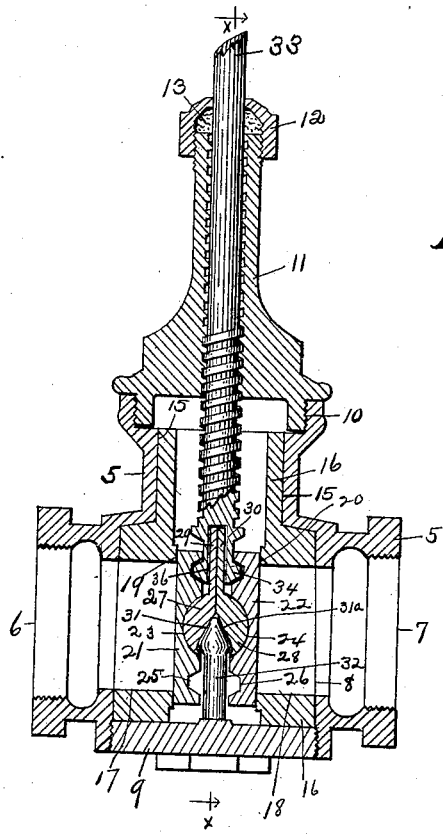
Figure 2:
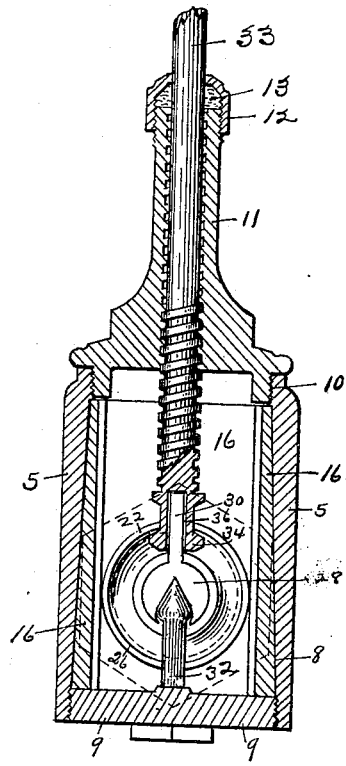

In the drawing—Figure 1 is a longitudinal sectional view of a straight-way valve embodying my improvements; Fig. 2 a longitudinal sectional view taken on the line $x$—$x$ of Fig. 1 of a valve complete; and Fig. 3 a detail view.

Referring to the drawing in detail—The reference numeral 5 represents the valve body provided with screw threaded pipe openings 6 and 7, and having a tapered bore 8 having its mouth screw threaded to receive the plug 9, and provided at its opposite end with a bonnet 11 carrying a packing nut 12 containing packing 13. Formed on opposite sides of the inner face of the body at the smaller end of the bore are two lips 15 the purpose of which will soon appear. Removably arranged in the bore 8 is a tapered casing or seat ring 16 provided in opposite sides with passages 17 and 18 registering respectively with the pipe openings 6 and 7, and having two circular valve seats 19 and 20 surrounding said passages 17 and 18, and having its exterior cylindrical face ground and tapered to fit the tapered bore 8 in the body 5, and having its smaller end flattened or squared to fit in between the said lips 15 to prevent the casing from rotating in the bore 8. Slidably arranged in the casing 16 are two circular gates 21 and 22 for engagement with seats 19 and 20, and provided respectively with central sockets 23 and 24 and with annular grooves 25 and 26. Seated respectively in the said sockets 23 and 24 are two semi-spherical shoes 27 and 28 having stems 29 and 30, and having formed in their adjacent faces semi-conical openings 31 and 31ª which together form a conical opening to receive the head of a round wedge 32. Arranged in the bonnet, which is interiorly screw threaded, is a screw stem 33 provided in its inner end with an opening 36 to loosely receive the said stems 29 and 30, and having formed on its inner end a button 34 arranged in the annular grooves 25 and 26 in the gates.

The operation of the valve as above described is as follows: When the valve is closed, as shown in drawing, it may be opened by unscrewing the stem 33 which releases the gates, from the wedge, and draws them towards the bonnet and opens the water passage. When the stem 33 is again screwed in to close the valve, one end of the wedge engages the plug and the opposite end of the wedge spreads the shoes 27 and 28 which in turn force the gates against the valve seats 19 and 20 and close the valve. When the valve is being opened the button 34 engages the walls on the outer side of the annular grooves in the gates and causes the gates to partially rotate and when the valve is being closed the said button engages the walls of the opposite sides of the annular grooves. As the walls of the opposite sides of the annular grooves vary considerably in diameter, the gates rotate less in one movement than the other when the valve is being opened and closed, thus continually changing the position of the gates on the seats when the valve is operated, thereby causing the gates and seats to wear evenly.

Figure 3:
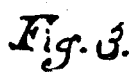

To prevent the shoes rotating in the sockets in the gates, a pin 35 as shown in Fig. 3 may be secured in each of the shoes.

Having thus described my invention, what I claim as new and desire to secure by Letters Patent, is—

1. In a valve of the character described; a body having pipe openings in its opposite sides, and having therein a tapered bore; a tapered casing removably and non-rotatably arranged in said bore, and having therein passages registering with the pipe openings in the body, and provided with valve seats surrounding said passages; a removable plug closing the larger end of said bore; two circular gates slidably and rotatably arranged in said casing, and having faces for engagement with said seats, and provided on their adjacent faces with centrally located sockets and annular grooves surrounding said sockets; shoes arranged in said sockets; a wedge arranged between the shoes; a bonnet secured to the end of the body opposite the said plug; and a stem arranged in the bonnet, and having on its inner end a button arranged in the annular grooves in the gates.

2. In a valve, a body having therein two pipe openings and a bore, two independently rotatable circular gates slidably arranged in the bore for closing the said pipe openings and each having formed in its inner face a central socket and an annular groove, a bonnet arranged in the end of the bore, a screw stem arranged in the bonnet and having on its inner end a button arranged in said annular grooves and having in its inner end a longitudinal bore, two semi-spherical shoes arranged in said sockets and having stems arranged in the said longitudinal bore and having semi-conical openings formed in their inner faces opposite each other, and a wedge having a head fitting the semi-conical openings in the shoes and having its opposite end adapted to engage the body whereby the head of the wedge will spread the shoes and the gates and close the pipe openings when the screw stem is screwed inwardly.

3. In a valve, a body having therein two pipe openings and a bore, two circular gates slidably arranged in the bore for closing the said pipe openings and each having formed in its inner face a socket and an annular groove surrounding said socket, a bonnet arranged in the end of the bore, a screw stem arranged in the bonnet and having on its inner end a button arranged in the said annular grooves and adapted to engage the walls of the grooves and rotate the gates in opposite directions, a sphere composed of two separable semi-spherical sections seated in the said sockets and having a flaring opening formed between them, and a wedge having one end arranged in said flaring opening and having its opposite end extending beyond the periphery of the gates and adapted to engage the body for the purpose described.

In testimony whereof I affix my signature in presence of two witnesses.

JOHN D. COLEMAN.

Witnesses:
  W. O. ROOT,
  MARY F. LINCOLN.